US012248686B2

(12) United States Patent
Rudrabhatla et al.

(10) Patent No.: US 12,248,686 B2
(45) Date of Patent: Mar. 11, 2025

(54) INTENT-DRIVEN STORAGE TIERS THAT PROTECT AND RELOCATE ASSETS

(71) Applicant: Dell Products L.P., Round Rock, TX (US)

(72) Inventors: Anand Rudrabhatla, Pleasanton, CA (US); George Mathew, Belmont, CA (US); Jehuda Shemer, Kfar Saba (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/318,043

(22) Filed: May 16, 2023

(65) Prior Publication Data

US 2024/0385756 A1 Nov. 21, 2024

(51) Int. Cl.
*G06F 3/06* (2006.01)

(52) U.S. Cl.
CPC ............ *G06F 3/0619* (2013.01); *G06F 3/065* (2013.01); *G06F 3/0683* (2013.01)

(58) Field of Classification Search
CPC ....... G06F 3/0619; G06F 3/065; G06F 3/0683
USPC ........................................................ 711/162
See application file for complete search history.

(56) References Cited

U.S. PATENT DOCUMENTS

2017/0177224 A1\* 6/2017 Glover ................. G06F 3/0653
2017/0220481 A1\* 8/2017 McKean ............... G06F 3/0611

\* cited by examiner

*Primary Examiner* — Hua J Song
(74) *Attorney, Agent, or Firm* — Dergosits & Noah LLP; Todd A. Noah (57) ABSTRACT

System creates mapping of storage intent, defined for digital asset, to primary storage tier, of primary storage tiers in primary protection storage system, that matches storage intent. System receives request to store copy of digital asset, and stores the copy with storage intent in primary storage tier, based on mapping of storage intent to primary storage tier. System identifies expanded group of storage tiers comprising primary storage tiers combined with additional storage tier. If additional storage tier matches storage intent more than primary storage tier matches storage intent, which is mapped to primary storage tier, system changes mapping of storage intent to primary storage tier into mapping of storage intent, defined for digital asset, to additional storage tier. System relocates each copy of digital asset, based on mapping of storage intent to primary storage tier, to additional storage tier, based on mapping of storage intent to additional storage tier.

20 Claims, 3 Drawing Sheets

INTENT-DRIVEN STORAGE TIERS THAT PROTECT AND RELOCATE ASSETS

BACKGROUND

A data object may be a group of information that is backed up as a unit. If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of the data object and the embedding of these values in a database's data structures) within dedicated backup files. When the data protection administrator decides to reinstate the data object to a previous state, the data protection administrator specifies the desired previous state by identifying a desired time when the data object was in this previous state, and then instructs the backup/restore application to execute a restore operation to restore a copy of the corresponding backup file(s) for that previous state to the data object.

As enterprises accelerate the digital transformation of their businesses, they are deploying dozens of new applications on-premises and in the cloud, while continuing to invest in existing core applications. In the process, these enterprises are generating multi-petabytes (PBs) of primary storage data which need backup protection. To address the needs of enterprises to protect this explosive growth of data while meeting business Service Level Objectives (SLO), backup vendors are offering scale-out integrated (backup software with storage software as single stack) multi-tenant platforms with storage tiering, such as non-volatile memory-based storage tiers, solid-state drive-based storage tiers, hard disc drive-based storage tiers, and object tiers for data protection. The storage tiers can provide flexibility to users, such as by balancing performance versus cost.

Such integrated scale-out platforms can protect multi-petabytes of client workloads, which may be referred to as assets or digital assets, while offering deduplication for cost efficiency. These assets may be classified based on their relative importance to an enterprise, such as mission critical, secondary but important, and not critical. Typically, the classification of an asset's relative importance is correlated with the level of service required by the backup storage to protect the asset by storing at least one copy to back up the asset. Therefore, the service level objectives may be associated either with an asset according to the importance of the asset or as part of an asset protection policy, such that there may be a need to assign a storage tier to backup an asset according to asset classifications and the rules and regulations of the enterprise.

DETAILED DESCRIPTION

Service level objectives tend to be defined in absolute values, such as 20,000 Input/Output (IO) operations, defined in relation to a specific deployment of a data protection system, such as "storage tier 2," or defined in association with protection policies or protected assets. Consequently, such a definition is not a customer-defined intention for a service level objective, but rather a system-supplied service definition. Such system-defined service level objectives can lose contextual meaning for a user of a data protection system over time, especially when the system evolves, and/or as the system's data is replicated. In this disclosure, a customer-defined intention for a service level objective may be referred to as a service level objective intent, a SLO intent, an intent (for brevity), a storage tier intent or a storage intent, as the users' intents will define the attributes of the storage tiers that protect the assets.

Figure 1:
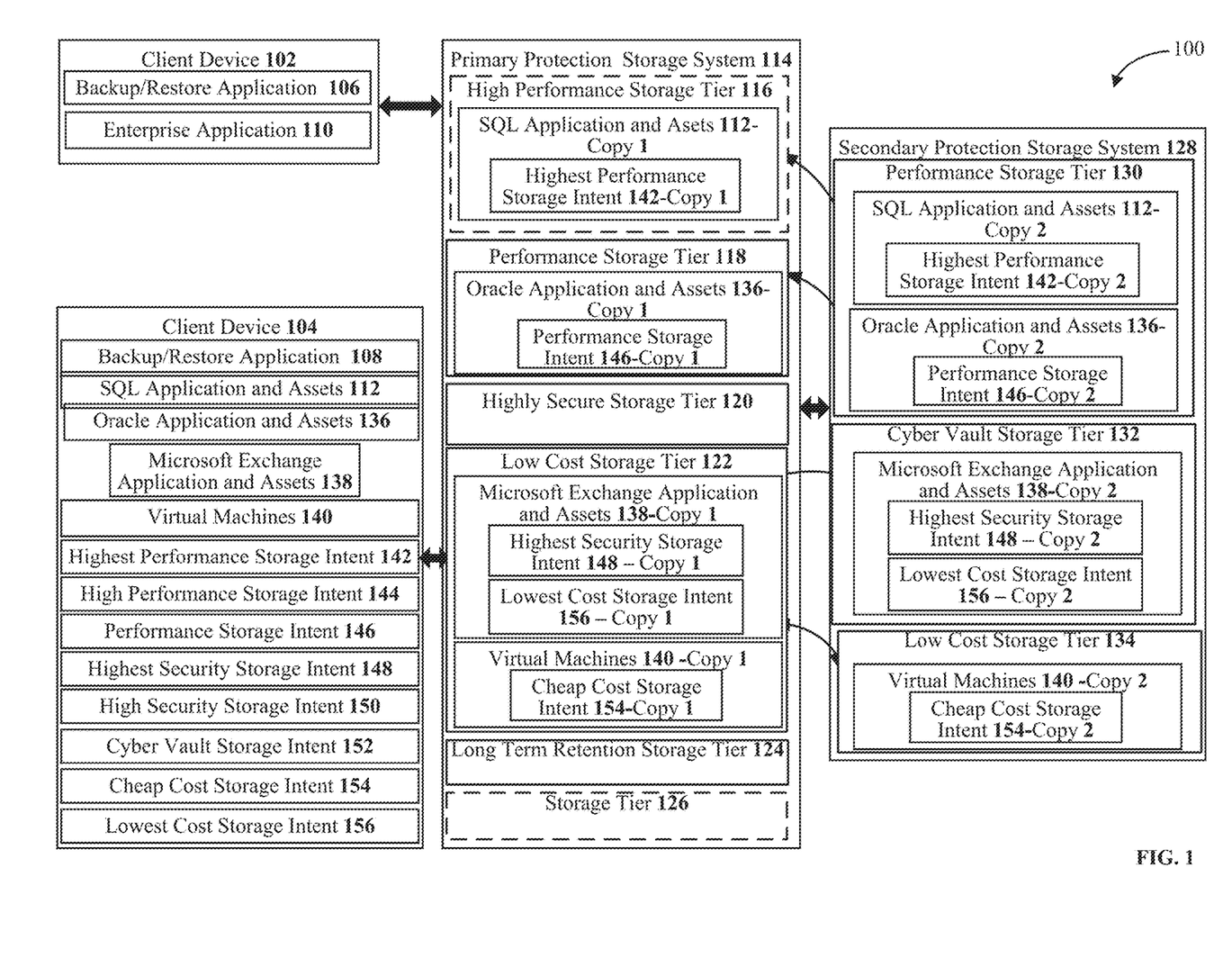
FIG. 1 illustrates a block diagram of an example data protection system which includes a primary data storage platform and a secondary data storage platform for intent-driven storage tiers that protect and relocate assets under an embodiment.

FIG. 1 illustrates a diagram of an example data protection system 100 in which client devices 102 and 104 execute respective backup/restore applications 106 and 108, such as Dell's PowerProtect Data Domain, to create backup files for digital assets such as data objects, which are generated by respective enterprise applications 110 and 112. The data protection system 100 can store these backup copies on a primary protection storage system 114, such as a primary data domain system, which include storage tiers 116-126, and which may be referred to as a local storage site 114 or a local site 114. The primary protection storage system 114 can replicate the backup copies to a secure secondary protection storage system 128, such as a disaster recovery data domain system, which includes additional storage tiers 130-134, and which may be referred to as a remote storage site 128 or a remote site 128. Such a data protection system 100 and its backup administrators can manage thousands of digital assets and tens of thousands of backup and restore jobs that protect these digital assets. The client device 104 executes the backup/restore application 108 to create backup files for an enterprise application 112 which creates digital assets, such as the SQL application and assets 112, the Oracle application and assets 136, the Microsoft Exchange application and assets 138, or the Virtual Machines 140, which a user can define various intents 142-156 for protecting these assets.

Embodiments herein enable intent-driven storage tiers that protect and relocate assets. A system enables a user to define a storage intent for a digital asset. The system creates a mapping of the storage intent, defined for the digital asset, to a primary storage tier, of primary storage tiers in a primary protection storage system, that matches the storage intent. The system receives a request to store a copy of the digital asset and stores the copy of the digital asset with the storage intent in the primary storage tier, based on the mapping that was created of the storage intent to the primary storage tier.

The system identifies an expanded group of storage tiers comprising the primary storage tiers combined with an additional storage tier. If the additional storage tier matches the storage intent more than the primary storage tier matches the storage intent, which is mapped to the primary storage tier, the system changes the mapping of the storage intent to the primary storage tier into a mapping of the storage intent, defined, for the digital asset, to the additional storage tier.

The system relocates each copy of the digital asset, which was stored in the primary storage tier, based on the mapping of the storage intent to the primary storage tier, to the additional storage tier, based on the mapping of the storage intent to the additional storage tier.

For example, the data protection system 100 provides a pre-defined list of storage intents to a backup administrator, who selects the "highest performance" storage intent 142 for storing backup copies of the SQL application and assets 112, and a "performance" storage intent 146 for storing backup copies of the Oracle application and assets 136. The backup administrator also selects a "highest security" storage intent 148 for storing backup copies of the Microsoft Exchange application and assets 138, and a "lowest cost" storage intent 156 for storing backup copies of the Virtual Machines 140. The data protection system 100 creates a mapping of the storage intent, which includes the mappings of the "highest performance" storage intent 142 to the matching "high-performance" primary storage tier 116, and the "performance" storage intent 146 to the matching "performance" primary storage tier 118. The mapping of the storage intent also includes the combination "highest security" storage intent 148 and the "lowest cost" storage intent 156 to the sufficiently matching (scored tiebreaker) "low cost" primary storage tier 122, and the "cheap cost" storage intent 154 to the matching "low cost" primary storage tier 122.

The data protection system 100 subsequently receives a request from the backup/restore application 106 to store backup copies of the SQL application and assets 112, the Oracle application and assets 136, the Microsoft Exchange application and assets 138, and the Virtual Machines 140. Then the data protection system 100 follows the mapping of the "highest performance" storage intent 142 to store a backup copy of the SQL application and assets 112 (and the storage intent 142) to the matching "high-performance" primary storage tier 116, and follows the mapping of the "performance" storage intent 146 to store a backup copy of the Oracle application and assets 136 (and the storage intent 146) to the matching "performance" primary storage tier 118. The data protection system 100 also follows the mapping of the combination of the "highest security" storage intent 148 and the "lowest cost" storage intent 156 to store a backup copy of the Microsoft Exchange application and assets 138 (and the storage intents 148 and 156) to the sufficiently matching "low cost" primary storage tier 122, and follows the mapping of the "cheap cost" storage intent 154 to store a backup copy of the Virtual Machines 140 to the matching "low cost" primary storage tier 122.

Later, the data protection system 100 identifies the addition of a new storage tier 116, that is labeled as a "high performance" storage tier 116, to the existing primary storage tiers 118-126. The data protection system 100 determines that this new "high performance" storage tier 116 is a better match for the backup administrator's "highest performance" storage intent for the backup copies of the SQL application and assets than the "performance" storage tier 118 is a match for the backup administrator's "highest performance" storage intent for the backup copies of the SQL application and assets. Therefore, the data protection system 100 changes the existing mapping from the backup administrator's "highest performance" storage intent for the backup copies of the SQL application and assets, into a new mapping from the backup administrator's "highest performance "storage intent for the backup copies of the SQL application and assets to the new "high performance" storage tier 116. Then the data protection system 100 uses the new mapping to relocate the backup copies of the SQL application and assets which were stored in the "performance" storage tier 118, based on the previous mapping from the backup administrator's "highest performance" storage intent, into the new" high performance" storage tier 116, based on the new mapping from the backup administrator's "highest performance" storage intent.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described to provide a concise discussion of embodiments of the present disclosure.

Although these embodiments are described in sufficient detail to enable one skilled in the art to practice the disclosed embodiments, it is understood that these examples are not limiting, such that other embodiments may be used, and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment may be included in at least one embodiment of the disclosure. The appearances of the phrase "embodiment" in various places in the specification do not necessarily all refer to the same embodiment.

The data protection system 100 can provide easy-to-understand terminology to a system user which enables the user to define the user's intentions, or intents, for service level objectives which are applied to assets within an enterprise. The data protection system 100 can apply a user's intentions for service level objectives to assets when the system evolves by adding any storage tiers to the system's existing storage tiers or removing any storage tiers from the system's existing storage tiers. The data protection system 100 can also use a user's intents for service level objectives to define what happens to copies of assets already stored in specific storage tiers as the system evolves. Additionally, the data protection system 100 can use a user's service level objective intents to define what happens when copies of assets are replicated or relocated to other storage tiers that have different service levels or distributions than the existing storage tiers.

The data protection system 100 enables a user to select from service level objective intents, which are defined at the enterprise level, and which are flexible to accommodate different ways of defining service level objective intents within an enterprise. The data protection system 100 can enable a user's selection of intents by providing the user with a pre-defined list of service level objective intents, and/or by using natural language processing to convert the user's text and/or voice messages regarding intentions for protecting an asset into service level objective intents. This approach provides more flexibility and leeway to a user in how they want to interpret complex, vague, or ill-defined service level objectives, and capture their intent without getting bogged down in complex Service Level Agreement terminology or measures that are not easily mapped to outcomes.

When a system user defines service level objective intents, the data protection system 100 responds to the user by assigning the service level objective intents to assets, protection policies, backup copy lifecycles, and/or other places where storage destinations are defined. Examples of service level objective intents can include the "fastest" storage tier available, the "slowest" storage tier available, the "cheapest" storage tier available, the "most secure" storage tier available, or the available storage tier which has the "best value-for-the-money," has the "fastest restore performance," has the "largest storage capacity," has the "largest remaining storage capacity," has the "most redundancy," has the "most energy efficiency," and/or has the "longest term for retention". Definitionally, a storage tier that is the "fastest" performs at higher speed, that is the "slowest" performs at lower speed, that is the "cheapest" is relatively inexpensive, that is the "most secure" has more protection against a threat, and that is the "best value" has an advantageous combination of cost and performance. The storage tier that has the "fastest restore performance" provides a relatively quick return to a previous condition, that has the "largest storage capacity" has space for retaining information, that has the "largest remaining storage capacity" has space which remains for retaining information, that has the "most redundancy" has data duplication which protects against failure, that has the "most energy efficiency" has a high ratio of work produced relative to resources expended, and that has the "longest term for retention" has a relatively large amount of time that data will be stored. Although each of the one or more service level objective intents that are associated with any asset and/or with the policies defined to protect any of these assets, each of the service level objective intents are not system specific or asset specific, because different systems may have different or possibly conflicting interpretations of any of these service level objective intents.

Upon executing a backup operation on an asset, the data protection system 100 identifies each individual service level objective intent assigned to the asset and/or each combination of service level objective intents assigned to the asset. Then the data protection system 100 applies such intents to the asset, which may require interpreting an intent, and/or require resolving how to apply the interpretation of multiple intents to an asset to identify a target storage tier which closely matches the asset's intent(s), which may be described as the best-fit for the asset's intent(s), or approximating the user's defined intent(s).

The interpretation of an intent may change over time as the systems and their storage tiers evolve. The simplest interpretation of an intent is one intent to one storage tier, such that at a given time any service level objective intent will be mapped to a specific storage tier that most closely matches a user's intent. When multiple intents are assigned to an asset and/or a policy, the resolution may be more complex. For example, a user may have defined more than one service level objective intent for an asset, such as assigning the "fastest" storage tier and the "most secure" storage tier to the same asset. If the data protection system 100 uses the simplest method and determines that each of these different intents resolve to a different storage tier, the data protection system 100 may resolve the storage tier to be assigned to the asset by using a method associated with scores, priorities, and/or preferences.

When using the score method, the data protection system 100 can award a relative number of points that represent each storage tier's measure of a respective intent to each storage tier, accumulate the corresponding points for each storage tier, and then identify the storage tier with the most cumulative points as the storage tier which was collectively intended by the user. For example, the data protection system 100 awards 10 points out of a possible 10 points for the intent of the "fastest" storage tier available to storage tier A and awards 8 points out of a possible 10 points for the intent of the "fastest" storage tier to available to storage tier B. Continuing this example, the data protection system 100 awards 8 points out of a possible 10 points for the intent of the "most secure" storage tier available to storage tier A and awards 9 points out of a possible 10 points for the intent of the "most secure" storage tier available to storage tier B. Completing this example, the data protection system 100 accumulates a total of 18 points (10 "fast" points plus 8 "secure" points) for storage tier A, accumulates a total of 17 points (8 "fast" points plus 9 "secure" points) for storage tier B, then identifies the storage tier A as having the most cumulative points as the best match or the best fit for the combination of the user's intents for the "fastest" storage tier available and the "most secure" storage tier available. If two or more storage tiers are tied for the most cumulative points, then the data protection system 100 can select any of these storage tiers as the closest match or the best fit for the user's intents.

When using a priority method, the data protection system 100 may prioritize the service level objective intents so that a higher intent counts first. For example, if "fastest" is a higher priority than "most secure," the resolution for an asset assigned the "fastest" intents and the "most secure" intents will be an asset defined with the fastest intent in case of a conflict. When using the preference method, the system user-defined domain preference, such as "performance preferred to price," or "security preferred to performance" will resolve any conflicts. This preference method is similar to the priority method, except that the preference method is more general and a domain level definition rather than a definition at a specific intent level. The data protection system 100 may also resolve any direct conflicts, such as when a user requests to assign the "fastest" storage tier available for an asset and the "slowest" storage tier available for the same asset. The data protection system 100 could use any of the preceding resolution options to handle this situation, or could resolve these obvious contradictions by directly identifying the contradictions to the user via the user interface and prompting the user to delete one of the contradictory intents assigned to the asset.

When creating a backup copy of an asset which is assigned to a service level objective intent, the data protection system 100 will store the service level objective intent in the backup copy's backup metadata. The data protection system 100 will also tag any files associated with the backup copy on the protection storage with the service level objective intents as well. In general, wherever there is a designation of storage, or actual storage of data, the data protection system 100 will store the service level objective intents with the stored data.

The data protection system 100 can transition a backup copy of an asset between storage tiers over time. The data protection system 100 can define the transition by using service level objective intents. For example, the data protection system 100 may assign an asset to be the storage tier with the highest performance@2 weeks, the storage tier with the lowest cost@4 weeks, and then the storage tier with long-term retention@364 weeks, or 7 years.

While adding any number of storage tiers to the existing storage tiers, or removing any number of storage tiers from the existing storage tiers, the data protection system 100 may create a mapping of some of the intents stored for the backup copies of assets to a more appropriate storage tier for an asset. If backup copies of assets are remapped to a different storage tier, the data protection system 100 can trigger the relocation of these backup copies to their best-fit storage tiers.

If a copy lifecycle is defined for a backup copy of an asset, the data protection system 100 evaluates every designation of a target storage tier via the updated mapping of service level objective intents. While a copy lifecycle is independent of the system evolution, there may be situations where the copy lifecycle and the system evolution may coincide in timing. The data protection system 100 is designed so that these situations are handled optimally and transparently.

The data protection system 100 propagates service level objective intents along with the backup copy of an asset when replicating the backup copy of the asset to a secondary protection storage system 128, which may be referred to as a "remote site." The data protection system 100 uses the same intent evaluation framework to make an appropriate placement choice from among the list of secondary storage tiers 130-134 that are available in the secondary protection storage system 128. The topology of the secondary storage tiers 130-134 in the secondary protection storage system 128 may be different from the topology of the primary storage tiers 116-126 in the primary protection storage system 114. Backup copies of assets stored in one type of a storage tier in the primary protection storage system 114 may differ from the types of storage tier in the secondary protection storage system 128, and vice-versa, backup copies of assets which are stored on various types of storage tiers in the primary protection storage system 114 may be stored on different types of storage tiers in the secondary protection storage system 128.

The following example illustrates how the data protection system 100 uses service level objective intents for best-fit placement and movement of backup copies of assets within a system and between systems. The following examples are depicted by the primary protection storage system 114, which functions as a local storage system 114, and the secondary protection storage system 128, which functions as a replica storage system 128, with each storage system 114 and 128 configured with different storage tiers 116-126 and 130-134, respectively. The data protection system 100 enables a user to define protection policies for the assets to be backed up to the primary protection storage system 114 by using the service level objective intents. The service level objective intents are consistent across an enterprise and the storage systems 114 and 128, while the storage tiers 116-126 and 130-134 can vary between the storage systems 114 and 128.

For this example, the data protection system 100 enables a user to define: <Highest Performance, PLC-1> for ASSET A, <Performance, PLC-2> for ASSET B, <Highest Security, PLC-3> for ASSET C, <Lowest Cost, PLC-4> for ASSET D, and <Highest Performance@2 weeks, Lowest cost@4 weeks, Long-term retention@364 weeks, PLC-4> for ASSET E. The primary protection storage system 114 is able to parse the intents associated with the protection policies for the assets A through E, and store the backup copies of the assets A through E in the best-fit storage tier based on the intent→storage tier mapping for assets A through D. This mapping results in asset A backed up to the "high-performance" primary storage tier 116, asset B backed up to "performance" storage tier 118, asset C backed up to "Highly Secure" storage tier 120, and asset D backed up to the "low-cost" primary storage tier 122 (such as on-premises ObjectScale). If asset E is defined with a lifecycle logic, then asset E needs to be moved as it ages, so the data protection system 100 moves backup copies for asset E between the storage tiers in the primary protection storage system 114 during the time periods, using the intent→storage tier mapping of the primary protection storage system 114.

If the assets A through D are replicated from the primary protection storage system 114 to the secondary protection storage system 128, the primary protection storage system 114 propagates the storage intents along with the backup copies for which the storage intents were defined, to the secondary protection storage system 128, which interprets the storage intents for placement in the best-fit storage tier by using its local storage intent→storage tier mapping. This results in the primary protection storage system 114 propagating the assets A & B to the best-fit storage tier on the secondary protection storage system 128, which is the "performance" storage tier 130. Then the primary protection storage system 114 stores Asset C in the "cyber vault" storage tier 132 of the secondary protection storage system 128 as the best-fit storage tier. This determination is made by the secondary protection storage system 128 comparing the primary protection storage system 114 propagating the intents for the backup copies of the assets and mapping them to available storage tiers that are the best-fit using its local storage intent→storage tier mapping. Asset D from the primary protection storage system 114 is placed in the best-fit storage tier on the secondary protection storage system 128 which is the "low-cost" secondary storage tier 134, which in this case happens to be in the public cloud.

The data protection system 100 periodically updates the storage intent→storage tier mapping on the individual systems 114 and 128 as storage tiers are added or removed. The data protection system 100 translates the service level objective intents of one or more target systems, and associates the service level objective intents with the resulting backup copies of assets, thus allowing correct backup copy relocation throughout system evolution and the copy lifecycle.

Figure 2:
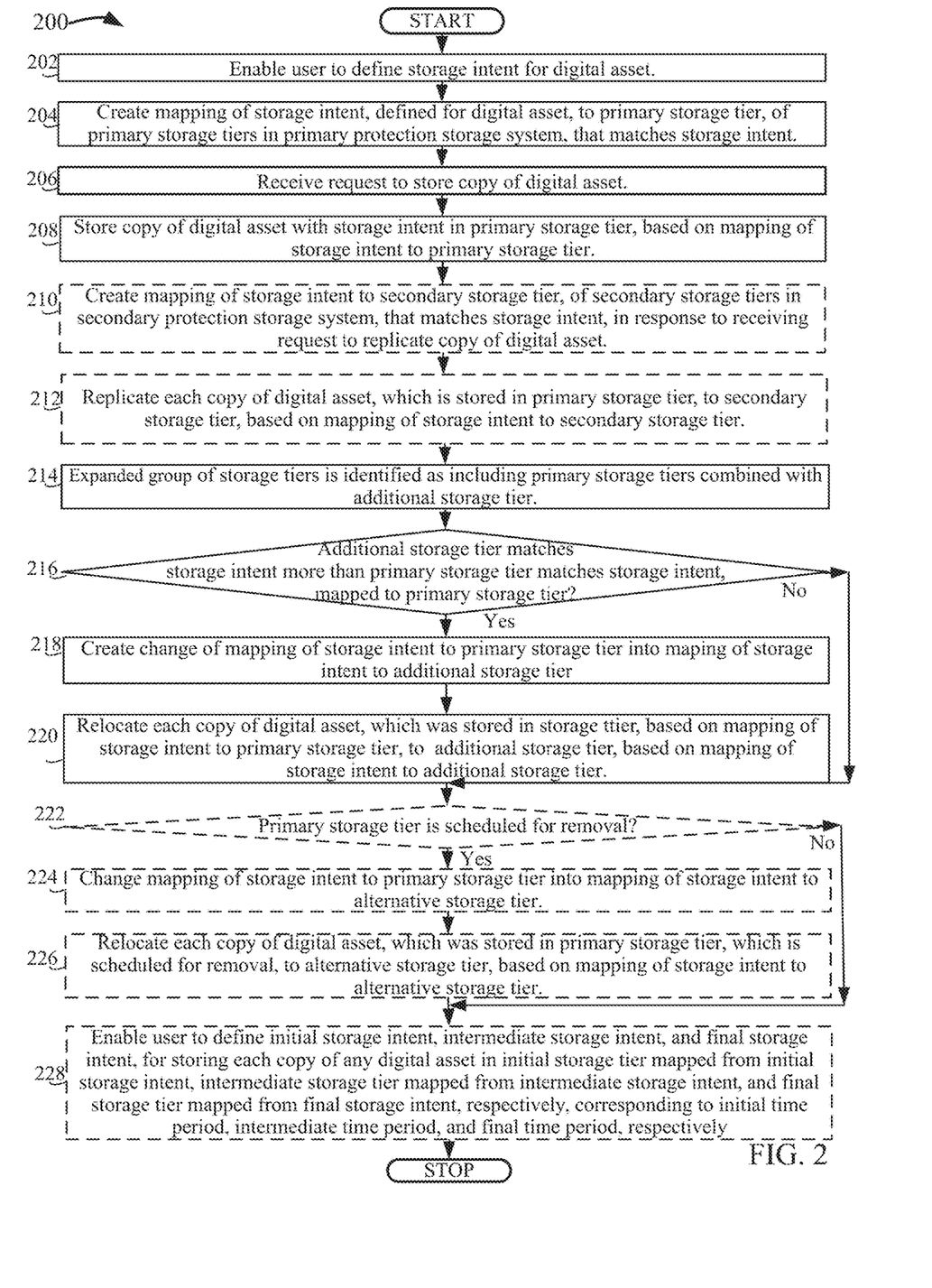
FIG. 2 is a flowchart that illustrates an example method for intent-driven storage tiers that protect and relocate assets under an embodiment.

FIG. 2 is a flowchart 200 that illustrates a method for intent-driven storage tiers that protect and relocate assets in an embodiment. Flowchart 200 depicts method acts illustrated as flowchart blocks for certain steps involving the client devices 102 and 104, the primary protection storage system 114, and/or the secondary protection storage system 128 of FIG. 1.

A user is enabled to define a storage intent for a digital asset, block 202. The system enables a backup administrator to define storage intents for copies of digital assets. For example, and without limitation, this can include the data protection system 100 providing a pre-defined list of storage intents to a backup administrator, who selects the "highest performance" storage intent 142 for storing backup copies of the SQL application and assets 112, a "performance" storage intent 146 for storing backup copies of the Oracle application and assets 136, a "highest security" storage intent 148 for storing backup copies of the Microsoft Exchange application and assets 138, and a "lowest cost" storage intent 156 for storing backup copies of the Virtual Machines 140.

Enabling a user to define a storage intent may be based on at least one of providing a pre-defined list of storage intents to the user, and using natural language processing to process a user input which defines the storage intent. For example, the data protection system 100 uses natural language processing to create a storage intent based on the user's spoken description of "the fastest storage tier available."

A user can be a person who operates a computer. A storage intent can be a purpose or goal associated with the retention of retrievable data on a computer. A digital asset can be anything electronic that has value, established ownership, and is discoverable. A pre-defined list can be a number of connected items or names written together and established in advance. Natural language processing can be computer analysis and understanding of written and/or spoken human communications. A user input can be information entered by a person who operates a computer.

After enabling the definition of a storage intent for a digital asset, the storage intent, defined for the digital asset, is mapped to a primary storage tier, of primary storage tiers in a primary protection storage system, that matches the storage intent, block 204. The system creates mapping of the user-defined storage intent to a storage tier that matches the storage intent. By way of example and without limitation, this can include the data protection system 100 mapping the storage intent, which a backup administrator defined as the "highestperformance" storage intent 142 for the backup copies of a SQL application and assets 112, to the primary storage tier 116, of the primary storage tiers 116-126 in the primary protection storage system 114, that is labeled as a "high-performance" primary storage tier 116, which matches the storage intent of the "highest performance" storage intent 142.

In another example, the data protection system 100 creates a mapping of the "performance" storage intent 146, which the backup administrator defined for the backup copies of the Oracle application and assets 136, to the "performance" primary storage tier 118, which matches the "performance" storage intent 146. In yet another example, the data protection system 100 creates a mapping of the combination "highest security" storage intent 148 and the "lowest cost" storage intent 156, which the backup administrator collectively defined as for the backup copies of the Microsoft Exchange application and assets 138, to the "low cost" primary storage tier 122 which partially matches the "lowest cost" storage intent 156, and was selected for this mapping due to a scored tiebreaker. In an additional example, the data protection system 100 creates a mapping of the "low cost" storage intent 154 storage intent, which a backup administrator defined for the backup copies of the Virtual Machines 140, to the "low cost" primary storage tier 122, which matches the storage intent of the "low cost" storage intent 154.

A storage tier can be a level within the hierarchy of a system for the retention of retrievable data on a computer. A primary storage tier can be a level within the hierarchy of a system for the retention of retrievable data on a computer, and that can be accessed without the use of a network. A primary protection storage system can be an apparatus that retains retrievable data for a computer and that can be accessed without the use of a network.

Following the mapping of a storage intent to a primary storage tier, a request is received to store a copy of a digital asset, block 206. The system receives a request to store a backup copy of a digital asset. In embodiments, this can include the data protection system 100 receiving a request from the backup/restore application 106 to store backup copies of a SQL application and assets 112, the Oracle application and assets 136, the Microsoft Exchange application and assets 138, and the Virtual Machines 140. A request can be an instruction to a computer to provide information or perform another function. A copy can be a thing made to be similar or identical to another thing. Although these examples describe a data protection system 100 creating a mapping for a storage intent to a storage tier prior to the data protection system 100 receiving a request to store a digital asset to the storage tier, the data protection system 100 can execute these actions in any order, such as waiting to receive a request to store a digital asset to a storage tier before attempting to create a mapping from the storage intent to the storage tier.

In response to receiving a request to store a copy of a digital asset, the copy of the digital asset is stored with the storage intent in a primary storage tier, based on a mapping of the storage intent to the primary storage tier, block 208. The system stores assets in the types of storage tiers intended by the backup administrator, along with the storage intent defined by the backup administrator, for future reference. For example, and without limitation, this can include the data protection system 100 storing the backup copy of the SQL application and assets 112—copy 1 in the "high performance" primary storage tier 116, by following the mapping from the backup administrator's highest performance storage intent 142 to store a backup copy of the SQL application and assets 112 to a storage tier identified as the "highest performance," such as the "high performance" primary storage tier 116. A mapping can be an association of an element of a group with an element of another group.

In another example, the data protection system 100 follows the mapping from the "performance" storage intent 146 to the "performance" primary storage tier 118, which then stores the backup copy of the Oracle application and assets 136—copy 1 and the "performance" storage intent 146—copy 1. In yet another example, the data protection system 100 follows the mapping from the combination of the "highest-security" storage intent 148 and the "lowest cost" storage intent 156 to the "low-cost" primary storage tier 122, which then stores the backup copy of the Microsoft Exchange application and assets 138—copy 1 and the "combination of the "highest-security" storage intent 148—copy 1 and the "lowest cost" storage intent 156—copy 1. In an additional example, the data protection system 100 follows the mapping from the "cheap cost" storage intent 154—copy 1 to the "low-cost" primary storage tier 122, which then stores the backup copy of the Virtual Machines 140—copy 1 and the "cheap cost" storage intent 154—copy 1.

Traditional data protection systems make decisions about what storage characteristics are selected for the storage tiers that will be storing digital assets at the time of creating a backup copy of a digital asset, which is at the time of storing the digital asset. Consequently, the knowledge of why an asset was previously placed in a particular storage tier is now lost. Therefore, the data protection system 100 also stores the storage intent together with the digital asset so that re-evaluation can occur later on, such as when replicating assets from a primary site to a secondary site. By storing the storage intent, the data protection system 100 enables the reprocessing of storage tier selections at a later time-disconnected from the original placement of assets in any storage tiers.

At the point where a copy of a digital asset is replicated or copied to a secondary protection storage, the backup copy of the digital asset has the storage intent associated with it, most likely as metadata. The data protection system 100 uses that storage intent to evaluate at the time of replication as to what would be the optimal target of a storage tier that stores that replica of a backup copy of an asset. In other words, the data protection system 100 creates a mapping of the original storage intent and stores the storage intent with the backup copy of the digital assets, to select from the available storage tier options in the target data protection system 100 right now. If the storage intent is stored as part of the copy of the asset, the evaluation now has additional information—the data protection system 100 records that asset1 was selected for performance while asset2 was for selected for security.

By storing the storage intent, the data protection system 100 retains that knowledge and can now make intelligent decisions that were previously not possible. Hence the data protection system 100 creates a mapping of the original storage intent to the current available data protection system 100 targets. A secondary storage tier can be a level within the hierarchy of a system for the retention of retrievable data on a computer, which is away from a usual workplace or location, making use of communications technology. A secondary protection storage system can be an apparatus that retains retrievable data for a computer and requires the use of a network to be accessed.

In response to receiving a request to replicate a copy of the digital asset, a mapping is optionally created of a storage intent, stored with the digital asset on a primary storage tier, to a secondary storage tier, of the secondary storage tiers in a secondary protection storage system, that matches the storage intent, block 210. The system can retrieve storage intents stored with digital assets stored to primary storage tiers to create mappings from the same storage intents to secondary storage tiers. In embodiments, this can include the data protection system 100 creating a mapping of the "highest performance" storage intent 142—copy 1 for storing backup copies of a SQL application and assets 112—copy 1, to the "performance" secondary storage tier 130, of the secondary storage tiers 130-134, that matches the "highest performance" storage intent 142—copy 1, in response to receiving a request to replicate the SQL application and assets 112—copy 1.

In another example, the data protection system 100 creates a mapping of a "performance" storage intent 146 for storing backup copies of Oracle application and assets 136—copy 1, to the performance storage tier 130, that matches the storage intent specified as the "performance" storage intent 146. In yet another example, a mapping is created of a "highest security" storage intent 148 and the "lowest cost" secondary storage tier 156 for storing backup copies of the Microsoft Exchange application and assets 138—copy 1, to a "cyber vault" secondary storage tier 132, that matches the "highest security" storage intent 148, and which was selected for this mapping due to a scored tiebreaker. In an additional example, a mapping is created of the "cheap cost" storage intent 154 for storing backup copies of the Virtual Machines 140—copy 1, to a "low-cost" secondary storage tier 134, that matches the "cheap cost" storage intent 154.

Having created the mappings of the storage intents to the secondary storage tiers, each copy of a digital asset, which is stored in a primary storage tier, is optionally replicated with the storage intent to a secondary storage tier, based on a mapping of the storage intent to the secondary storage tier, block 212. The system can replicate the primary protection storage system's backup copies and storage intents to the secondary protection storage system. For example, and without limitation, this can include the data protection system 100 replicating each copy of any digital asset, and its storage intent, which is already stored in the primary storage tiers 116-126, and which is mapped from any storage intent to any secondary storage tier, to be stored in the secondary storage tiers 130-134 in the secondary protection storage system 128.

Replicating each copy of a digital asset may include at least one of mapping both a first storage intent and a second storage intent to one of the primary storage tiers 116-126 in the primary protection storage system 114, while mapping the first storage intent and the second storage intent to two of the secondary storage tiers 130-134 in the secondary protection storage system 128, or mapping a third storage intent and a fourth storage intent to two of the primary storage tiers 116-126 in the primary protection storage system 114, while mapping both the third storage intent and the fourth storage intent to one of the secondary storage tiers 130-134 in the secondary protection storage system 128. For example, the data protection system 100 originally created a mapping of the "highest performance" storage intent 142 for the backup copies of the SQL application and assets 112 to the "high-performance" primary storage tier 116 and a mapping of the "performance" storage intent 146 for storing backup copies of the Oracle application and assets 136 to the "performance" storage tier 118, while the data protection system 100 creates a mapping for the "highest performance" storage intent 142 for the backup copies of the SQL application and assets 112 to the "performance" secondary storage tier 130 and a mapping the "performance" storage intent 146 for the backup copies of the Oracle application and assets 136 to the same "performance" secondary storage tier 130. In another example, the data protection system 100 originally created a mapping of the combination of the "highest security" storage intent 148 and the "lowest cost" storage intent 156 for the backup copies of the Microsoft Exchange application and assets 138 to the "low-cost" primary storage tier 122, which a scored tiebreaker selected for this mapping, and a mapping of the "cheap cost" storage intent 154 for storing backup copies of the Virtual Machines 140 to the same "low-cost" primary storage tier 122. In contrast, the data protection system 100 creates a mapping for the combination of the "highest security" storage intent 148 and the "lowest cost" storage intent 156 for the backup copies of Microsoft Exchange application and assets 138, which a scored tiebreaker selected for this mapping, to the "cyber vault" secondary storage tier 132 and a mapping of the "cheap cost" storage intent 154 for storing backup copies of the Virtual Machines 140 to the different "low-cost" secondary storage tier 134.

Consequently, the data protection system 100 stores the backup copies of the SQL application and assets 112 and the backup copies of the Oracle application and assets 136 in different primary storage tiers 116 and 118 in the primary protection storage system 114, and yet store the backup copies of the SQL application and assets 112 and the backup copies of the Oracle application and assets 136 in the same secondary storage tier 130 in the secondary protection storage system 128. Similarly, the data protection system 100 stores the backup copies of the Microsoft Exchange application and assets 138 and the backup copies of the Virtual Machines 140 in the same "low-cost" primary storage tier 122 in the primary protection storage system 114, and yet store the backup copies of the Microsoft Exchange application and assets 138 and the backup copies of the Virtual Machines 140 in different secondary storage tiers 132 and 134 in the secondary protection storage system 128. A mapping can be the act of associating an element of a group with an element of another group.

Having stored copies of digital assets and the corresponding storage intents in primary storage tiers, an expanded group of storage tiers is identified as including the primary storage tiers combined with an additional storage tier, block 214. The system identifies the adding of a storage tier to the existing primary storage tiers. By way of example and without limitation, this can include the data protection system 100 identifying the addition of a new "high performance" primary storage tier 116 to the existing primary storage tiers 118-126. An expanded group can be a collection, which has become larger, of things that belong together or resemble one another or are usually found together.

After identifying the addition of a storage tier to the primary storage tiers, a determination is made whether the additional storage tier matches the storage intent more than the primary storage tier matches the storage intent, which is mapped to the primary storage tier; block 216. The system evaluates if the additional storage tier is a better match for the backup copies' storage intent than the current primary storage tier is a match for the backup copies' storage intent, such that some backup copies may need to be relocated. In embodiments, this can include the data protection system 100 determining whether the "high-performance" primary storage tier 116 which was just added to the primary storage tiers 118-126 is a better match for the backup administrator's storage intent of the "highest performance" than the "performance" storage tier 118 is a match for the backup administrator's storage intent of the "highest performance," for storing backup copies of the SQL application and assets 112. If an additional storage tier is a better match, or best-fit, for a storage intent which was used to store any copy of a digital asset in any service tier, the method 200 continues to block 2180 to relocate some copies of the digital asset. If the additional storage tier 116 is not a better match for a storage intent which was used to store any copy of any digital asset in a primary storage tier, the method 200 proceeds to block 222 to determine whether a primary storage tier is scheduled to be removed.

If the additional storage tier is a better match for a storage intent than the primary storage tier is a match for the storage intent, then the mapping of the storage intent to the primary storage tier is changed into a mapping of the storage intent to the additional storage tier, block 218. The system creates mappings of backup copies of assets that a storage intent was mapping the backup copies in the past into a mapping of the storage intent to a storage tier that will be storing the backup copies in the future. For example and without limitation, this can include the data protection system 100 changing the mapping of the backup administrator's storage intent to store the backup copies of the SQL application and assets 112 in the "highest performance" storage tier, which was the "performance" storage tier 118, into a mapping of the backup administrator's storage intent to store the backup copies of the SQL application and assets 112 in the "high-performance" primary storage tier 116, which is now the best match for the "high-performance" primary storage intent.

Following the remapping of a storage intent from a previous storage tier to the newest storage tier, each copy of a digital asset, which was stored in a primary storage tier based on a mapping of the storage intent to the primary storage tier, is relocated to the additional storage tier, based on the mapping of the storage intent to the additional storage tier, block 220. The system relocates backup copies based on automatically remapping storage intents to storage tiers. By way of example and without limitation, this can include the data protection system 100 relocating each of the backup copies of the SQL application and assets 112 stored in the "performance" primary storage tier 118 based on the "high-est performance" storage intent, into the "high-performance" primary storage tier 116.

Whether a primary storage tier is scheduled for removal is optionally determined, block 222. The system can identify primary storage tiers which will be removed. In embodiments, this can include the data protection system 100 identifying the scheduled removal of the "low-cost" primary storage tier 122, and the impact that the removal may have on the storage intents to store a backup copy of the Virtual Machines 140 on the low-cost" primary storage tier 122 that is scheduled for removal. A removal can be the act of taking something away from a particular location.

If a primary storage tier is scheduled for removal, then a mapping of a storage intent to the primary storage tier is optionally changed into a mapping of the storage intent to an alternative storage tier, block 224. The system can compensate for the removal of a storage tier by remapping its storage intents for its backup copies to one or more alternative storage tiers. For example, and without limitation, this can include the data protection system 100 changing a mapping of a storage intent, defined for the backup copies of the Virtual Machines 140, to the "low-cost" primary storage tier 122 is changed into a mapping of the storage intent, defined for the backup copies of the Virtual Machines 140, to an alternative storage tier 126.

After changing the mapping of a storage intent to a primary storage tier into the mapping of the storage intent to an alternative storage tier, each copy of the digital asset, which was stored in the primary storage tier based on a mapping of the storage intent to the primary storage tier, which is scheduled for removal, is optionally relocated to the alternative storage tier, based on the mapping of the storage intent to the alternative storage tier, block 226. The system can relocate asset copies between storage tiers as needed. By way of example and without limitation, this can include the data protection system 100, relocating the backup copies of the Virtual Machines 140 from the "low-cost" primary storage tier 122 that is scheduled for removal to the "long-term retention" storage tier 124, which is a continuingly available storage tier, which is also a "low-cost" storage tier.

A user may be enabled to define an initial storage intent, an intermediate storage intent, and a final storage intent, for storing each copy of any digital asset in an initial storage tier mapped from the initial storage intent, an intermediate storage tier mapped from the intermediate storage intent, and a final storage tier mapped from the final storage intent, respectively, corresponding to an initial time period, an intermediate time period, and a final time period, respectively, block 228. The system can provide backup copy lifecycle management. In embodiments, this can include the data protection system 100 applying backup copy lifecycle management by storing a copy of a digital asset in the storage tier 116 with the "highest performance" for the first two weeks, relocating the copy of the digital asset to the "low-cost" primary storage tier 122 with the lowest cost for the third through sixth week, and then relocating the copy of the digital asset to the long-term retention storage tier 124 for the seventh through three hundred and seventieth week. In this example, a user defines the backup copy lifecycle management as "Highest Performance@2 weeks, Lowest cost@4 weeks, Long-term retention@364 weeks."

Although FIG. 2 depicts the blocks 202-2283 occurring in a specific order, the blocks 202-228 may occur in another order. In other implementations, each of the blocks 202-28 may also be executed in combination with other blocks and/or some blocks may be divided into a different group of blocks.

A backup/restore application 106 may be a Dell Corporation's PowerProtect® Data Manager backup/restore application, which supports Microsoft SQL/Exchange/DB2/Oracle/SAP Oracle/SAP HANA/Filesystem/Hadoop and ProtectPoint solutions, as well as Kubernetes containers and virtual environments. Providing more than just access to backups and restore capabilities, PowerProtect® Data Manager provides analytics and reuse for development/testing, leverages the cloud to extend data center capabilities, and protects cloud native applications. PowerProtect® Data Manager's automated orchestration of fail-over, failback, and testing simplifies production disaster recovery scenarios. PowerProtect® Data Manager empowers data and application owners to perform self-service backup and restore operations from native applications directly to Dell protection storage appliances.

When superior performance is crucial, PowerProtect® Data Manager provides a direct path between Dell tier one storage and PowerProtect® Data Domain and/or Data Domain. PowerProtect® Data Manager extends protection to the cloud by tiering backups to cloud storage for long-term retention, thereby maximizing retention and access to backups without impacting on-premises protection storage resources. When tiering is not enough, PowerProtect® Data Manager enables disaster recovery to the public cloud. At the same time, PowerProtect® Data Manager's governance control provides IT with the necessary oversight and governance to ensure compliance, making even the strictest service level objectives obtainable.

The backup/restore application 106 may be a Dell Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft® Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups.

The core NetWorker® software backs up client file systems and operating system environments. Add-on database and application modules provide backup services for products such as Microsoft® Exchange Server. Client backup data may be sent to a remote NetWorker® storage node or stored on a locally attached device using a dedicated storage node. Dell Corporation's NetWorker® modules for Microsoft® applications supports Microsoft® products such as Microsoft® Exchange, Microsoft® Sharepoint, Microsoft® SQL Server, and Microsoft® Hyper-V servers.

The backup/restore application 106 may be Dell Corporation's Avamar® backup/restore application, which provides fast, efficient backup and recovery through a complete software and hardware solution. Equipped with integrated variable-length deduplication technology, Dell Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for an immediate single step restore. The transmission of deduplicated backup sends only changed blocks, reducing network traffic.

Dell Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. Dell Corporation's Avamar® data store features redundant power and networking, redundant array of independent disks, and redundant array of inexpensive nodes technology to provide uninterrupted data accessibility. Periodic checks of data systems ensure recoverability whenever needed. Dell Corporation's Avamar® systems may be deployed in an integrated solution with Dell Corporation's Data Domain® systems for high-speed backup and recovery of specific data types.

The backup/restore application 106 may use different policies for various data protection levels, such as a "gold" policy for VMware® clients, a "platinum" policy for UNIX® clients, and a "silver" policy for Windows® clients. The gold policy can specify to store two backup copies for each Vmware® client's application resources onto the first disk for six months, store a primary clone of the backup copies onto the second disk for one year, and store a secondary clone of the backup copies onto a tape for five years. In another example, a policy can provide redundancy by specifying to replicate each full backup copy to three different backups servers, replicate each incremental cumulative backup copy and each incremental differential backup copy to two different backup servers, replicate each archive log backup copy to an additional backup server, and relocate each full backup copy created at the end of the month to cloud tiering for long term retention. Backup copies stored in the cloud tiering have higher costs associated with storing and accessing the data in the backup copies. A policy's start time can specify the start times for creating a backup copy of an application resource, such as 12:00, 13:00, 14:00, and 15:00, for an hourly backup copy, a policy's retention policy can specify the length of time that a backup copy is retained before the backup copy is destroyed, such as a week, a month, or a year, and a policy's destination pool can include the target storage device where backup copies are stored.

Figure 3:
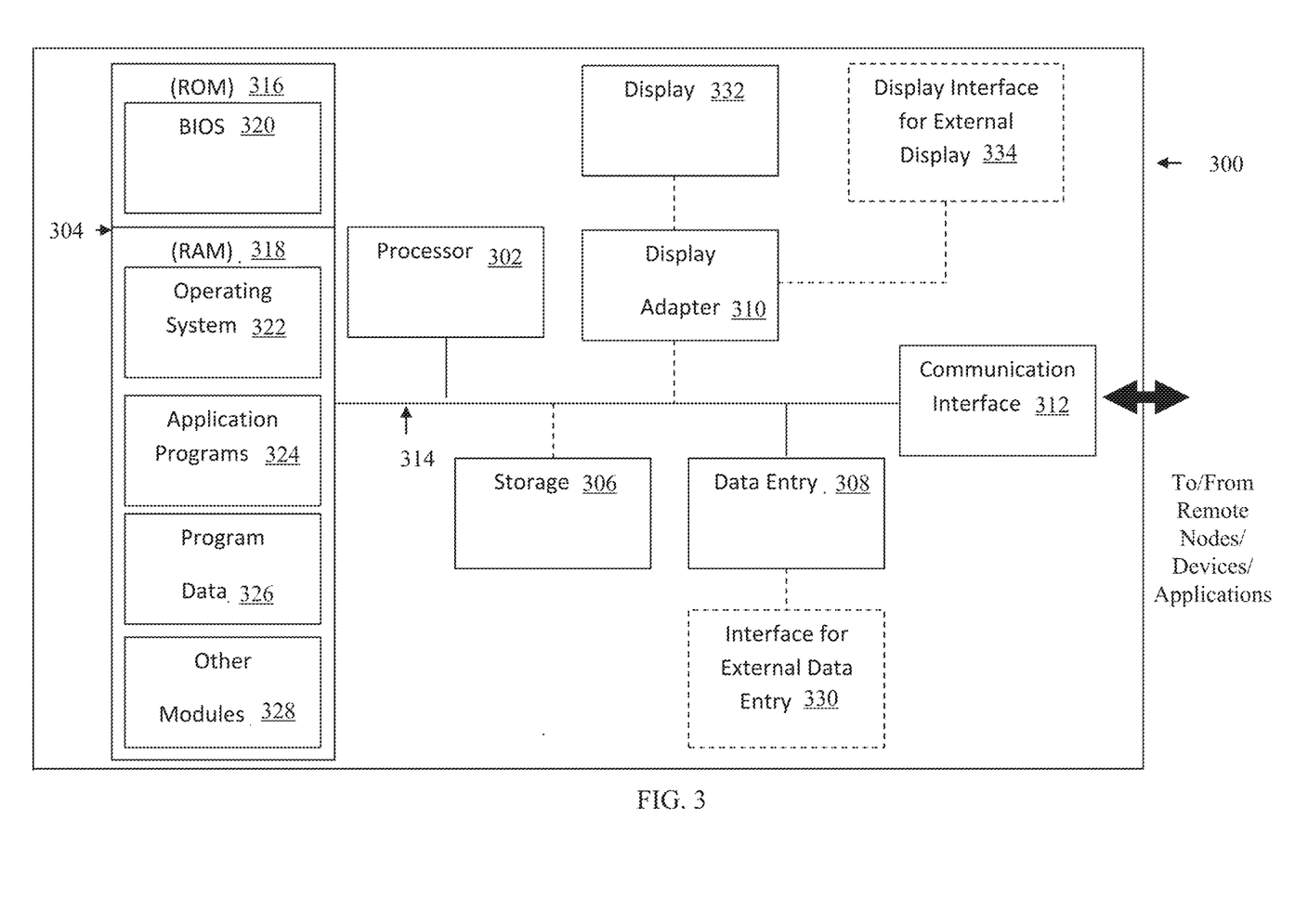
FIG. 3 is a block diagram illustrating an example hardware device in which the subject matter may be implemented.

Having described the subject matter in detail, an exemplary hardware device in which the subject matter may be implemented shall be described. Those of ordinary skill in the art will appreciate that the elements illustrated in FIG. 3 may vary depending on the system implementation. With reference to FIG. 3 an exemplary system for implementing the subject matter disclosed herein includes a hardware device 300, including a processing unit 302, memory 304, storage 306, a data entry module 308, a display adapter 310, a communication interface 312, and a bus 314 that couples the elements 304-312 to the processing unit 302.

The bus 314 may comprise any type of bus architecture. Examples include a memory bus, a peripheral bus, a local bus, etc. The processing unit 302 is an instruction execution machine, apparatus, or device and may comprise a microprocessor, a digital signal processor, a graphics processing unit, an application specific integrated circuit (ASIC), a field programmable gate array (FPGA), etc. The processing unit 302 may be configured to execute program instructions stored in the memory 304 and/or the storage 306 and/or received via the data entry module 308.

The memory 304 may include read only memory (ROM) 316 and random-access memory (RAM) 318. The memory 304 may be configured to store program instructions and data during operation of the hardware device 300. In various embodiments, the memory 304 may include any of a variety of memory technologies such as static random-access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example.

The memory 304 may also include nonvolatile memory technologies such as nonvolatile flash RAM (NVRAM) or ROM. In some embodiments, it is contemplated that the memory 304 may include a combination of technologies such as the foregoing, as well as other technologies not specifically mentioned. When the subject matter is implemented in a computer system, a basic input/output system (BIOS) 320, containing the basic routines that help to transfer information between elements within the computer system, such as during start-up, is stored in the ROM 316.

The storage 306 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD, or other optical media. The drives and their associated computer-readable media provide nonvolatile storage of computer readable instructions, data structures, program modules and other data for the hardware device 300. It is noted that the methods described herein may be embodied in executable instructions stored in a computer readable medium for use by or in connection with an instruction execution machine, apparatus, or device, such as a computer-based or processor-containing machine, apparatus, or device.

It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for conducting the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high-definition DVD (HD-DVD™), a BLU-RAY disc; and the like.

A number of program modules may be stored on the storage 306, the ROM 316 or the RAM 318, including an operating system 322, one or more applications programs 324, program data 326, and other program modules 328. A user may enter commands and information into the hardware device 300 through the data entry module 308. The data entry module 308 may include mechanisms such as a keyboard, a touch screen, a pointing device, etc. Other external input devices (not shown) are connected to the hardware device 300 via an external data entry interface 330.

By way of example and not limitation, external input devices may include a microphone, joystick, game pad, satellite dish, scanner, or the like. In some embodiments, external input devices may include video or audio input devices such as a video camera, a still camera, etc. The data entry module 308 may be configured to receive input from one or more users of the hardware device 300 and to deliver such input to the processing unit 302 and/or the memory 304 via the bus 314.

A display 332 is also connected to the bus 314 via the display adapter 310. The display 332 may be configured to display output of the hardware device 300 to one or more users. In some embodiments, a given device such as a touch screen, for example, may function as both the data entry module 308 and the display 332. External display devices may also be connected to the bus 314 via an external display interface 334. Other peripheral output devices, not shown, such as speakers and printers, may be connected to the hardware device 300.

The hardware device 300 may operate in a networked environment using logical connections to one or more remote nodes (not shown) via the communication interface 312. The remote node may be another computer, a server, a router, a peer device, or other common network node, and typically includes many or all the elements described above relative to the hardware device 300. The communication interface 312 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network).

Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 312 may include logic configured to support direct memory access (DMA) transfers between the memory 304 and other devices.

In a networked environment, program modules depicted relative to the hardware device 300, or portions thereof, may be stored in a remote storage device, such as, for example, on a server. It will be appreciated that other hardware and/or software to establish communications between the hardware device 300 and other devices may be used.

The arrangement of the hardware device 300 illustrated in FIG. 3 is but one possible implementation, and other arrangements are possible. It should also be understood that the various system components (and means) defined by the claims, described below, and illustrated in the various block diagrams represent logical components that are configured to perform the functionality described herein. For example, one or more of these system components (and means) may be realized, in whole or in part, by at least some of the components illustrated in the arrangement of the hardware device 300.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 3.

Other components may be implemented in software, hardware, or a combination of software and hardware. Moreover, some or all these other components may be combined, some may be omitted altogether, and additional components may be added while still achieving the functionality described herein. Thus, the subject matter described herein may be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it.

The computer, which reconfigures or otherwise alters the operation of the device in a manner well understood by those skilled in the art. The data structures where data is maintained are physical locations of the memory that have properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation to encompass all such modifications and similar arrangements.

What is claimed is:

1. A system for intent-driven storage tiers that protect and relocate assets, comprising:
   one or more processors; and
   a non-transitory computer readable medium storing a plurality of instructions, which when executed, cause the one or more processors to:
   create a mapping of a storage intent defined for a digital asset to one of a plurality of primary storage tiers of a primary protection storage system in response to receiving a user definition of the storage intent for the digital asset, the mapped primary storage tier matching the storage intent;
   store, in response to receiving a request to store a copy of the digital asset, a copy of the digital asset with the storage intent in the mapped primary storage tier based on the mapping of the storage intent to the primary storage tier;
   identify an expanded group of storage tiers comprising the primary storage tiers combined with an additional storage tier;
   change the mapping of the storage intent to the primary storage tier into a mapping of the storage intent, defined, for the digital asset, to the additional storage tier, in response to a determination that the additional storage tier matches the storage intent more than the primary storage tier matches the storage intent, which is mapped to the primary storage tier; and
   relocate each copy of the digital asset, which was stored in the primary storage tier, based on the mapping of the storage intent to the primary storage tier, to the additional storage tier, based on the mapping of the storage intent to the additional storage tier.

2. The system of claim 1, wherein enabling the user to define the storage intent comprises at least one of providing a pre-defined list of storage intents to the user, and using natural language processing to process a user input which defines the storage intent.

3. The system of claim 1, wherein the primary storage tier which stores the copy of the digital asset is defined as at least one of being fastest, slowest, cheapest, most secure, or best value, or having a fastest restore performance, a largest storage capacity, a largest remaining storage capacity, a most redundancy, a most energy efficiency, or a longest term for retention.

4. The system of claim 1, wherein the plurality of instructions further causes the processor to:
   create a mapping of the storage intent to one of a plurality of secondary storage tiers in a secondary protection storage system, the mapped secondary storage tier matching the storage intent, in response to receiving a request to replicate the copy of the digital asset; and
   replicate each copy of the digital asset that is stored in the mapped primary storage tier, and the storage intent, to the mapped secondary storage tier based on the mapping of the storage intent to the secondary storage tier.

5. The system of claim 4 wherein replicating each copy of the digital asset may include at least one of mapping both a first storage intent and a second storage intent to one primary storage tier in the primary protection storage system, while mapping the first storage intent and the second storage intent to two secondary storage tiers in the secondary protection storage system, or mapping a third storage intent and a fourth storage intent to two primary storage tiers in the primary protection storage system, while mapping both the third storage intent and the fourth storage intent to one secondary storage tier in the secondary protection storage system.

6. The system of claim 1, wherein the plurality of instructions further causes the processor to:
   determine whether the primary storage tier is scheduled for removal;
   change the mapping of the storage intent to the primary storage tier into a mapping of the storage intent to an alternative storage tier, in response to a determination that the primary storage tier is scheduled for removal; and
   relocate each copy of the digital asset, which was stored in the primary storage tier, which is scheduled for removal, to the alternative storage tier, based on the mapping of the storage intent to the alternative storage tier.

7. The system of claim 1, wherein the plurality of instructions further causes the processor to enable the user to define an initial storage intent, an intermediate storage intent, and a final storage intent, for storing each copy of any digital asset in an initial storage tier mapped from the initial storage intent, an intermediate storage tier mapped from the intermediate storage intent, and a final storage tier mapped from the final storage intent, respectively, corresponding to an initial time period, an intermediate time period, and a final time period, respectively.

8. A computer-implemented method for intent-driven storage tiers that protect and relocate assets, the computer-implemented method comprising:

mapping a storage intent defined for a digital asset to one of a plurality of primary storage tiers of a primary protection storage system in response to receiving a user definition of the storage intent for the digital asset, the mapped primary storage tier matching the storage intent;

storing, in response to receiving a request to store a copy of the digital asset, a copy of the digital asset with the storage intent in the mapped primary storage tier based on the mapping of the storage intent to the primary storage tier;

identifying an expanded group of storage tiers comprising the primary storage tiers combined with an additional storage tier;

changing the mapping of the storage intent to the primary storage tier into a mapping of the storage intent, defined, for the digital asset, to the additional storage tier, in response to a determination that the additional storage tier matches the storage intent more than the primary storage tier matches the storage intent, which is mapped to the primary storage tier; and relocating each copy of the digital asset, which was stored in the primary storage tier, based on the mapping of the storage intent to the primary storage tier, to the additional storage tier, based on the mapping of the storage intent to the additional storage tier.

9. The computer-implemented method of claim 8, wherein enabling the user to define the storage intent comprises at least one of providing a pre-defined list of storage intents to the user, and using natural language processing to process a user input which defines the storage intent.

10. The computer-implemented method of claim 8, wherein the primary storage tier which stores the copy of the digital asset is defined as at least one of being fastest, slowest, cheapest, most secure, or best value, or having a fastest restore performance, a largest storage capacity, a largest remaining storage capacity, a most redundancy, a most energy efficiency, or a longest term for retention.

11. The computer-implemented method of claim 8, wherein the computer-implemented method further comprises:

creating a mapping of the storage intent to one of a plurality of secondary storage tiers in a secondary protection storage system, the mapped secondary storage tier matching the storage intent, in response to receiving a request to replicate the copy of the digital asset; and replicating each copy of the digital asset that is stored in the mapped primary storage tier, and the storage intent, to the mapped secondary storage tier based on the mapping of the storage intent to the secondary storage tier.

12. The computer-implemented method of claim 11, wherein replicating each copy of the digital asset may include at least one of mapping both a first storage intent and a second storage intent to one primary storage tier in the primary protection storage system, while mapping the first storage intent and the second storage intent to two secondary storage tiers in the secondary protection storage system, or mapping a third storage intent and a fourth storage intent to two primary storage tiers in the primary protection storage system, while mapping both the third storage intent and the fourth storage intent to one secondary storage tier in the secondary protection storage system.

13. The computer-implemented method of claim 8, wherein the computer-implemented method further comprises:

determining whether the primary storage tier is scheduled for removal;

changing the mapping of the storage intent to the primary storage tier into a mapping of the storage intent to an alternative storage tier, in response to a determination that the primary storage tier is scheduled for removal; and relocating each copy of the digital asset, which was stored in the primary storage tier, which is scheduled for removal, to the alternative storage tier, based on the mapping of the storage intent to the alternative storage tier.

14. The computer-implemented method of claim 8, wherein the computer-implemented method further comprises enabling the user to define an initial storage intent, an intermediate storage intent, and a final storage intent, for storing each copy of any digital asset in an initial storage tier mapped from the initial storage intent, an intermediate storage tier mapped from the intermediate storage intent, and a final storage tier mapped from the final storage intent, respectively, corresponding to an initial time period, an intermediate time period, and a final time period, respectively.

15. A computer program product, comprising a non-transitory computer-readable medium having a computer-readable program code embodied therein to be executed by one or more processors, the program code including instructions to:

create a mapping of a storage intent defined for a digital asset to one of a plurality of primary storage tiers of a primary protection storage system in response to receiving a user definition of the storage intent for the digital asset, the mapped primary storage tier matching the storage intent;

store, in response to receiving a request to store a copy of the digital asset, a copy of the digital asset with the storage intent in the mapped primary storage tier based on the mapping of the storage intent to the primary storage tier;

identify an expanded group of storage tiers comprising the primary storage tiers combined with an additional storage tier;

change the mapping of the storage intent to the primary storage tier into a mapping of the storage intent, defined, for the digital asset, to the additional storage tier, in response to a determination that the additional storage tier matches the storage intent more than the primary storage tier matches the storage intent, which is mapped to the primary storage tier; and relocate each copy of the digital asset, which was stored in the primary storage tier, based on the mapping of the storage intent to the primary storage tier, to the additional storage tier, based on the mapping of the storage intent to the additional storage tier.

16. The computer program product of claim 15, wherein enabling the user to define the storage intent comprises at least one of providing a pre-defined list of storage intents to the user, and using natural language processing to process a user input which defines the storage intent, and the primary storage tier which stores the copy of the digital asset is defined as at least one of being fastest, slowest, cheapest, most secure, or best value, or having a fastest restore performance, a largest storage capacity, a largest remaining storage capacity, a most redundancy, a most energy efficiency, or a longest term for retention.

17. The computer program product of claim 15, wherein the program code includes further instructions to:
create a mapping of the storage intent to one of a plurality of secondary storage tiers in a secondary protection storage system, the mapped secondary storage tier matching the storage intent, in response to receiving a request to replicate the copy of the digital asset; and
replicate each copy of the digital asset that is stored in the mapped primary storage tier, and the storage intent, to the mapped secondary storage tier based on the mapping of the storage intent to the secondary storage tier.

18. The computer program product of claim 17, wherein replicating each copy of the digital asset may include at least one of mapping both a first storage intent and a second storage intent to one primary storage tier in the primary protection storage system, while mapping the first storage intent and the second storage intent to two secondary storage tiers in the secondary protection storage system, or mapping a third storage intent and a fourth storage intent to two primary storage tiers in the primary protection storage system, while mapping both the third storage intent and the fourth storage intent to one secondary storage tier in the secondary protection storage system.

19. The computer program product of claim 15, wherein the program code includes further instructions to:
determine whether the primary storage tier is scheduled for removal
change the mapping of the storage intent to the primary storage tier into a mapping of the storage intent to an alternative storage tier, in response to a determination that the primary storage tier is scheduled for removal; and
relocate each copy of the digital asset, which was stored in the primary storage tier, which is scheduled for removal, to the alternative storage tier, based on the mapping of the storage intent to the alternative storage tier.

20. The computer program product of claim 15, wherein the program code includes further instructions to enable the user to define an initial storage intent, an intermediate storage intent, and a final storage intent, for storing each copy of any digital asset in an initial storage tier mapped from the initial storage intent, an intermediate storage tier mapped from the intermediate storage intent, and a final storage tier mapped from the final storage intent, respectively, corresponding to an initial time period, an intermediate time period, and a final time period, respectively.

* * * * *